United States Patent [19]
Schaub

[11] Patent Number: 5,809,619
[45] Date of Patent: Sep. 22, 1998

[54] HOSE CLAMP

[75] Inventor: Erwin Schaub, Jacksonville, Fla.

[73] Assignee: Stant Corporation, St. Augustine, Fla.

[21] Appl. No.: 811,705

[22] Filed: Mar. 5, 1997

[51] Int. Cl.$^6$ ................................................ F16L 33/00
[52] U.S. Cl. ............................ 24/274 R; 24/275; 24/279
[58] Field of Search ................................. 24/274 R, 275, 24/274 P, 279, 285; 411/515

[56] References Cited

U.S. PATENT DOCUMENTS

| | | | |
|---|---|---|---|
| 2,767,455 | 10/1956 | Schaefer | 24/274 R |
| 3,028,650 | 4/1962 | Tinsley | 24/274 R |
| 4,103,637 | 8/1978 | Luc | 24/274 R |
| 5,315,737 | 5/1994 | Ouimet | 24/274 R |

FOREIGN PATENT DOCUMENTS 0607598  9/1948  United Kingdom ................. 24/274 R

*Primary Examiner*—Victor N. Sakran
*Attorney, Agent, or Firm*—Banner & Witcoff, Ltd.

[57] ABSTRACT

An improved hose clamp is described with an improved clamp insertion feature that enhances the insertion of the clamp band into the screw housing. The improved hose clamp comprises a screw housing having a ramp extending out from the housing wall, a rotatable screw mounted within the screw housing and having a tip or end piece. The hose clamp also has a clamp band with spaced apart slots along the length of the band. As the clamp band is inserted into the housing, the screw tip slides up on the ramp, thereby lifting the screw relative to the screw housing and significantly improving the ease of inserting the clamp band into the screw housing.

4 Claims, 2 Drawing Sheets

HOSE CLAMP

BACKGROUND OF THE INVENTION

This invention relates to improvements in hose clamps. Hose clamps are generally used to connect a hose to a tube or pipe and are commonly found in many instances, including automobiles and aircraft. Hose clamps of this type generally consist of a thin elongated band having spaced-apart slots along its length. The band wraps around a hose and, at one end, engages a screw that is mounted within a screw housing, and at the other end, the band is fixedly attached to the screw housing. An early patent describing a common hose clamp is the patent to Schaefer, U.S. Pat. No. 2,767,455. In a hose clamp of the type described by Schaefer, difficulty arises when trying to insert the band into the housing. Many times the screw must be manually lifted away from its engaged position before inserting the band.

Other times, the manual lifting of the screw is not always a requirement. If the band is inserted into the housing and pushed against the angled front thread of the screw, the screw may rise into the disengaged position, thereby allowing the band to pass through the housing. However, on many occasions this does not work because the friction conditions are high or the angle of the front thread of the screw is too steep to cause the screw to rise. In these situations, when the non-fixed end of the band is inserted into the screw housing, the front thread of the screw tilts downwardly and the rear end of the screw tilts upwardly and abuts against the housing. Once the screw tilts into this position, the screw binds with the band and prevents the desired insertion of the non-fixed end of the band into the housing.

The present invention recognizes and provides a solution to this problem in providing a unique hose clamp having a ramp or flare that raises the screw in relation to the screw housing to significantly enhance the ease of inserting the band into the screw housing.

Accordingly, an object of the present invention is to provide a hose clamp with improved band insertion capabilities. Another object of the invention is to provide a hose clamp that does not require lifting the screw manually and keeping it lifted until the band has been inserted as desired.

SUMMARY OF THE INVENTION

The present invention provides a hose clamp with improved clamp band insertion capabilities comprising, in the preferred embodiment, a screw housing, a band, and a rotatable screw within the screw housing. The screw housing further comprises a base, a front bearing face having a ramp extending out from the bearing face and defining an opening in the front bearing face, and a rear bearing face defining an opening in the rear bearing face. The band has a first and second end, the first end having a plurality of spaced apart slots and the second end attached to the base of the screw housing. The rotatable screw has a thread that engages the spaced apart slots of the band. The rotatable screw also has a screw head at one end and a tip at the other end. The tip is placed outwardly from the screw housing and adjacent to the ramp that extends out from the front bearing face.

As the first end of the band is inserted into the screw housing through the opening in the front bearing face, the band exerts a force in the axial direction on the screw, this causes the screw tip to slide up the ramp of the front bearing face, thereby lifting the screw relative to the screw housing and permitting entry of the first end of the band into the screw housing.

In the preferred embodiment of the invention, the ramp extends out from the front bearing face and towards the base of the screw housing at an angle of approximately 10 to 25 degrees measured from the vertical plane of the front bearing face. Further, the ramp forms a bend line on the front bearing face at an angle of approximately 45 degrees from the horizontal center of the opening of the front bearing face. Due to the unique angle of the ramp, the ramp lifts the screw relative to the screw housing when the first end of the band is inserted in the screw housing, thereby preventing the screw from tilting and binding with the band so as to prevent insertion of the first end of the band through the screw housing. In addition, the present invention does not require lifting the screw manually and keeping it lifted until the first end of the band has been inserted as desired.

BRIEF DESCRIPTION OF THE DRAWINGS

The preferred embodiment of the invention is illustrated in the drawings, wherein like reference numerals refer to like elements in the various views, and wherein.

DETAILED DESCRIPTION OF THE PREFERRED EMBODIMENT

Figure 1:
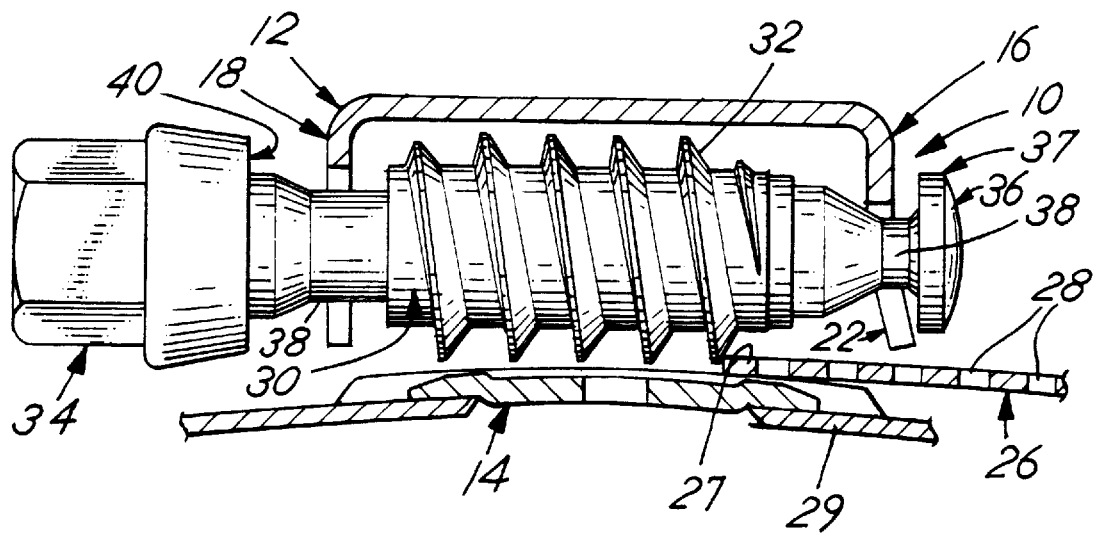
FIG. 1 is a cut-a-way side elevation view of the improved hose clamp band of the present invention before the clamp band is inserted into the screw housing.
Figure 5:
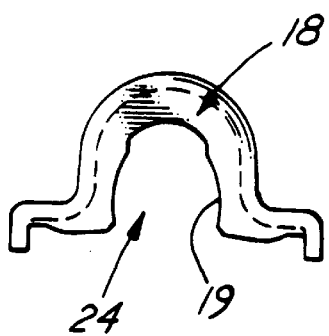
FIG. 5 is a rear elevation view of the rear bearing face of the screw housing.
Figure 3:
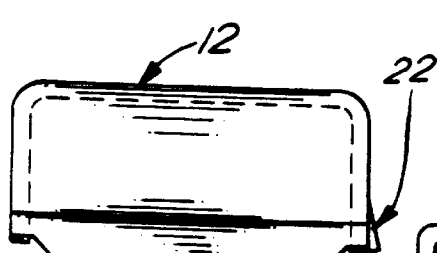
FIG. 3 is a side elevation view of the screw housing further illustrating the ramp of the present invention.
Figure 4:
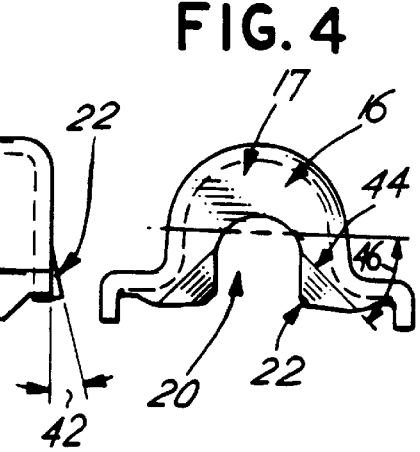
FIG. 4 is a front elevation view of the front bearing face of the screw housing illustrating the ramp adjacent to the opening of the screw housing.

In the present invention, the preferred embodiment of the improved hose clamp 10 is illustrated in FIG. 1. The improved hose clamp 10 comprises generally, a screw housing 12, a rotatable screw 30 mounted within a screw housing 12, and a clamp band 26. The screw housing 12 has abase 14, a front bearing face 16, and a rear bearing face 18. The screw housing 12 is typically semi-cylindrical in shape and surrounds the rotatable screw 30 mounted within the screw housing 12. As depicted in FIG. 4, the front bearing face 16 defines a front opening 20. Front opening 20 allows the rotatable screw 30 to extend out of the screw housing 12. As illustrated in FIGS. 1–4, the front bearing face 16 also has a ramp 22 extending out from the bearing face 16. The ramp 22 extends out from the front bearing face 16 and preferably forms an angle 42 of approximately 10 to 25 degrees measured from the vertical plane of the front bearing face 16. See FIG. 3. FIG. 4 shows that ramp 22 is located adjacent to the opening 20 and forms a bend line 44 on the front bearing face 16 at an angle 46 of approximately 45 degrees measured from the horizontal center of the opening 20. The ramp 22 advantageously provides a means for lifting the rotatable screw 30 away from the clamp band 26 when the clamp band 26 is inserted into the screw housing 12. Referring to FIG. 5, the rear bearing face 18 defines a rear opening 24. Rear opening 24 allows the rotatable screw 30 to extend out of the screw housing 12.

Figure 2:
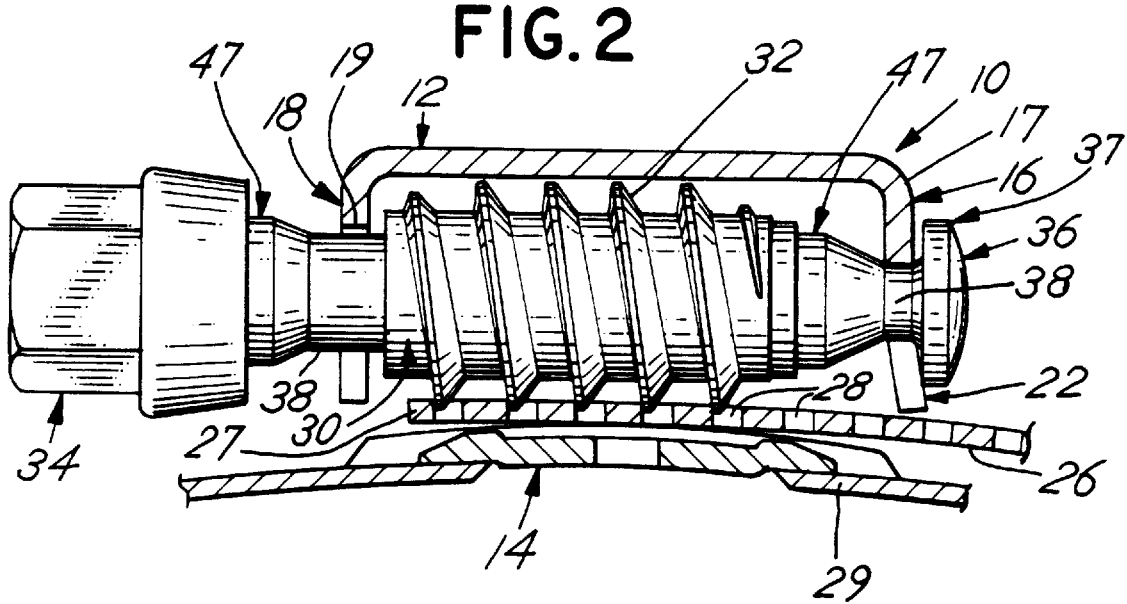
FIG. 2 is a cut-a-way side elevation view of the improved hose clamp band of the present invention after the clamp band is inserted into the screw housing.
Figure 6:
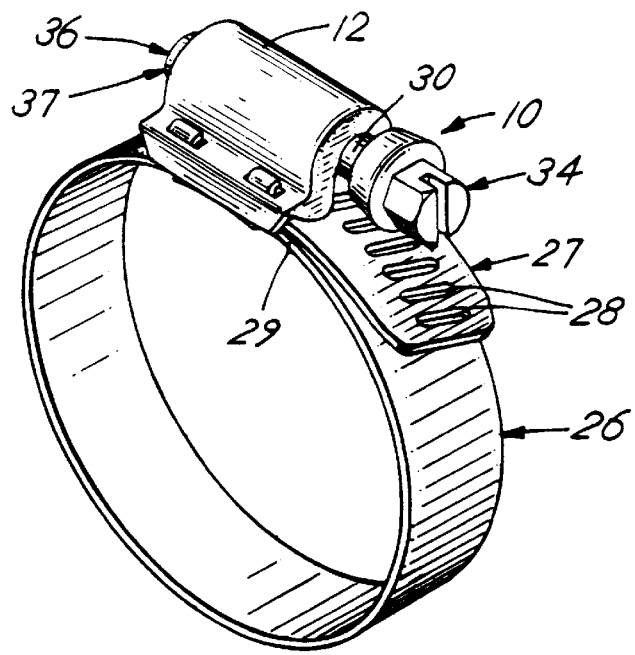
FIG. 6 is a perspective view of the hose clamp assembly of the present invention.

As illustrated in FIG. 6, the clamp band 26 is a thin elongated band that, when in operation, wraps around a hose and engages the rotatable screw 30 within the screw housing 12, thereby clamping the hose to a tube or pipe. As shown in FIG. 1, the clamp band 26 has a first end 27, spaced apart slots 28 in the band that are located along the length of the band, and a second end 29 that is attached to the screw housing 12 at the base 14. As shown in FIG. 2, the rotatable screw 30 is rotatable within the screw housing 12 and has a thread 32 that engages the spaced apart slots 28 as the rotatable screw 30 is rotated into operative engagement with the spaced apart slots 28 of the clamp band 26. The rotatable screw 30 also has a screw head 34 at one end and a tip 36 that is a radial portion 37 at the other end. See FIG. 6. When the band is being inserted, the tip 36 of the rotatable screw 30 is adjacent to the front bearing face 16 of the screw housing 12. After insertion, the screw thread 32 will engage slots 28, either due to rotation of the screw 30 or due to a gravity drop of the screw after the insertion is complete. The screw head 34 may be any standard or non-standard head that also provides for any means for tightening or loosening the rotatable screw 30. Rotatable screw 30 further comprises bearing portions 47 adjacent the thread for journaling the screw within the screw housing 12. Rotatable screw 30 further comprises small diameter portions 38 which enable the screw to rise up and out of the thread engagement position. The rotatable screw 30 also has a radial shoulder portion 40 located adjacent to the thread that abuts against the rear bearing face 18 when the screw 30 is operatively engaged with the spaced apart slots 28 of the clamp band 26.

As shown in FIGS. 1 and 2, the radial portion 37 of the tip 36 of the rotatable screw 30 has a predetermined diameter such that, when the first end 27 of the clamp band 26 is inserted in the screw housing 12, the tip 36 slides up on the ramp 22 that is located adjacent to the opening 20. When the screw 30 slides up the ramp, it is in a disengaged position and several inches of band may be quickly inserted. This process permits the user to dispense with the tedious process of rotating the screw in order to achieve the insertion of several inches of band. The thread 32 of the screw 30 can then be rotated into operative engagement with the spaced apart slots 28. Advantageously, the combination of the tip 36 of the rotatable screw 30 and the ramp 22 on the front bearing face 16 lifts the rotatable screw 30 relative to the screw housing 12, thereby enhancing the ease of inserting the first end 27 of the clamp band 26 into the screw housing 12. Moreover, the effect of the sliding of the tip 36 up on the ramp 22 reduces tilting of the rotatable screw 30 and this prevents the rotatable screw 30 from hindering the insertion of the first end 27 of the clamp band 26 into the screw housing 12 as desired.

Those of ordinary skill in the art will recognize that modifications can be made to the improved hose clamp described herein without departure from the true spirit and scope of the invention. For example, the angle of the ramp as described herein is dictated somewhat by the diameter and configuration of the screw tip; therefore, the angle of the ramp may be modified accordingly. This true spirit and scope of the invention is defined by the appended claims, to be interpreted in light of the foregoing specification.

What is claimed:

1. An improved hose clamp comprising:

a screw housing comprising a base, a front bearing face, and a rear bearing face, the front bearing face defining a front opening and having a ramp extending out from the front bearing face and adjacent to the front opening defined by the front bearing face, the rear bearing face defining a rear opening, the ramp of the front bearing face extending out from the front bearing face at an angle approximately 10 to 25 degrees from the front bearing face, the ramp forming a bend line on the front bearing face at an angle approximately 45 degrees from the front opening;

a clamp band having a first and second end, the first end defining a plurality of spaced apart slots, the second end attached to the base of the screw housing;

a rotatable screw within the screw housing, the rotatable screw having a thread engaging the spaced apart slots of the clamp band and a screw head at one end and a tip at the other end, the tip placed outwardly from the screw housing and adjacent to the ramp;

wherein when the first end of the clamp band is inserted into the front opening defined by the front bearing face of the screw housing, the tip of the rotatable screw slides up on the ramp of the front bearing face and lifts the rotatable screw relative to the screw housing and permits rapid insertion of the first end of the clamp band into the screw housing.

2. An improved hose clamp comprising a screw housing having a base, a front bearing face, and a rear bearing face, the front bearing face defining a front opening and the rear bearing face defining a rear opening, an adjustable clamp band having a first and second end, the first end having a plurality of spaced apart slots, the second end attached to the screw housing, a rotatable screw within the screw housing, the rotatable screw having a thread engaging the spaced apart slots of the band and a screw head at a first end and a tip at a second opposite end, the rotatable screw having bearing portions adjacent the thread and the screw head, the bearing portions journaling the rotatable screw in the front and the rear bearing faces, the improvement comprising:

a ramp extending out at an angle approximately 10 to 25 degrees from the front bearing face, the ramp being located adjacent to the front opening, the ramp forming a bend line on the front bearing face at an angle approximately 45 degrees from the front opening, whereby as the first end of the clamp band is inserted in the screw housing, the tip of the rotatable screw slides up on the ramp of the front bearing face and lifts the rotatable screw relative to the screw housing and permits rapid insertion of the first end of the clamp band into the screw housing.

3. An improved hose clamp comprising a screw housing having a base, a front bearing face, and a rear bearing face, the front bearing face defining a front opening and the rear bearing face defining a rear opening, an adjustable clamp band having a first and second end, the first end having a plurality of spaced apart slots, the second end attached to the base of the screw housing, a rotatable screw within the screw housing, the rotatable screw having a thread engaging the spaced apart slots of the clamp band and a screw head at a first end and a tip at a second opposite end, the rotatable screw having a radial shoulder portion adjacent to the screw head abutting against the rear bearing face when the screw operatively engages the spaced apart slots, the rotatable screw also having bearing portions adjacent the thread, the bearing portions journaling the rotatable screw in the openings of the front and the rear bearing faces, the improvement comprising:

a ramp extending out from the front bearing face at an angle approximately 10 to 25 degrees from the front bearing face, the ramp located adjacent to the front opening and forming a bend line on the front bearing face at an angle approximately 45 degrees from the opening, wherein when the first end of the clamp band is inserted into the front opening defined by the front bearing face of the screw housing, the tip of the rotatable screw slides up on the ramp of the front bearing face and lifts the rotatable screw relative to the screw housing and permits rapid insertion of the first end of the clamp band into the screw housing.

4. The hose clamp as in claim 3, wherein the ramp and the tip of the rotatable screw combine to lift the rotatable screw relative to the screw housing when the first end of the clamp band is inserted into the screw housing, thereby reducing tilting of the rotatable screw and thus preventing the rotatable screw from hindering insertion of the first end of the band into the screw housing as desired.

\* \* \* \* \*